2,775,561
VISCOUS COMPOSITION AND METHOD OF MAKING THE SAME

Stanley H. Frohmader, Madison, Wis., assignor to Research Products Corporation, Madison, Wis., a corporation of Wisconsin No Drawing. Application July 2, 1952,
Serial No. 296,956

17 Claims. (Cl. 252—308)

This invention relates to improvements in viscous compositions and methods for making the same, and particularly to such compositions composed of modified mineral oil or having modified mineral oil as the base. The composition is in the form of a non-fluid paste or cream and has valuable properties for a wide field of use, examples of which are for the making of salves, ointments, cosmetic creams, adhesive compositions for application to the surface of an impingement type of air filter, and the like.

It is an object of the invention to provide compositions of the character described having improved consistency and stability characteristics. They have a uniform homogeneous consistency which is retained for a long period of time without undergoing substantial separation of the ingredients. This consistency and also a relatively uniform viscosity are retained with changes in temperature normally encountered as winter cold and summer heat.

A further object of the present invention is to provide improved compositions and methods of the character described having the advantage that manufacture is simple and requires little time, labor, machinery and plant space.

It is a further object of the invention to provide compositions of the character described having a relatively high viscosity employing a mineral oil having a relatively low viscosity.

A further object is to provide a composition of the character described in which the liquid mineral oil exhibits a mobile characteristic within the body of the composition.

It is a further object of the invention to provide a composition of the character described which is thixotropic.

It is a further object of the invention to provide a composition of the character described which may have the viscosity thereof reduced by heating to an elevated temperature and then slowly cooling.

The objects of the invention are obtained, briefly, by adding to the mineral oil a suitable quantity of a modifying agent which may be microcrystalline wax, or a similar material as described hereinafter, dissolving said agent in the oil at a temperature sufficiently high to bring about solution and then rapidly cooling or chilling the solution from said high temperature to a low temperature at which the agent is not soluble in the oil. During the chilling the microcrystalline wax goes out of true solution and into a colloidally dispersed condition in which it imparts to the mineral oil base the improved consistency and stability characteristics described above. The operation usually results in a substantial increase in the viscosity of the composition. If the mineral oil is of low viscosity, for example if it is of liquid or fluid character, the procedure causes it to be thickened to a non-fluid, plastic paste or cream. Such a paste or cream is thixotropic in character. If the mineral oil is itself of high viscosity there may be a less pronounced increase in viscosity but the advantages of uniform consistency and stability are obtained. The cream or paste is useful as a final product for many applications and it may also be used as a base or vehicle in which additional ingredients are incorporated to form a product useful for other application.

The oil which may be used and which is embraced within the term "mineral oil" as the same is used herein in the specification and claims are the oils which are liquid at any temperature in the range from 0° C. to 60° C. and which are essentially hydrocarbons occurring in mineral oil, their distillates and their cracked or polymerized derivatives, an example of the last being polybutene which includes the polymers of butylene and its isomers. The mineral oil may be of any desired character or viscosity, from one which is a thin liquid to one which is thick such that it does not flow at ordinary temperature (20° C.). Where the composition is to be used in ointments, salves, cosmetic creams, or the like a purified mineral white oil is preferred.

When using a mineral oil of low viscosity, the chilling of the solution containing microcrystalline wax has a pronounced thickening effect and a high viscosity product results. For example, a mineral oil which is liquid at room temperature, with the proper amount of microcrystalline wax, is thickened by the said procedure into a stiff cream or paste. In addition to the pronounced increase in viscosity, other very valuable properties are obtained in that the cream composition is highly homogeneous, of smooth texture and fine grained character, and retains its character and consistency without any segregation of the constituents for long periods of time and under varying temperature conditions. Segregation is usually evidenced by separation of a portion of the mineral oil as a liquid at the top of the composition, which condition is referred to as bleeding. Substantial bleeding is usually objectionable in such creams and pastes and an important advantage of the present invention is that the compositions exhibit no bleed or such a slight amount as to be unobjectionable. Where the mineral oil is itself of high viscosity there may be less increase in viscosity, but the other advantages of homogeneity, consistency retention, absence of bleed, etc. are obtained.

While the composition of the invention is highly stable, the liquid oil is held thereby in a mobile condition. If the composition is placed on a blotter diffusion of mineral oil therefrom into the blotter takes place extensively. In the same way when an oil soluble dye is introduced locally into the composition diffusion of the dye throughout the composition takes place to a remarkable degree. Activity in both of these respects is much more extensive in the composition of the invention than in a petrolatum of substantially equivalent viscosity. In the composition of the invention the liquid mineral oil is held in a mobile condition within a space lattice formed by the microcrystalline wax. This mobility which results in greater diffusion is an important advantage for many purposes. For medicated ointments it results in more effective medication of the skin or other surface being treated.

As stated heretofore, the modifying agent contemplated by the invention is microcrystalline wax. This material is composed of saturated hydrocarbon compounds of 40 to 50 carbon atoms with average molecular weights of 560 to 700. In contrast to the paraffinic waxes, microcrystalline wax cannot be distilled at atmospheric pressure without some decomposition. The compounds are largely branched chain molecules with the branches occurring at random along the carbon chain. There are usually some ring compounds present also. In its crystal pattern, microcrystalline wax forms relatively small irregular crystals in contrast to the large well-formed crystals of paraffin wax.

Some of the available ozokerites are very similar to microcrystalline wax and may be used as the modifying agent. Ozokerite is a natural wax the chemical constitution of which is not definitely known but which appears to be a mixture of solid saturated and unsaturated hydrocarbons of high molecular weight with some liquid hydrocarbons and oxygenated bodies (Commercial Waxes, by Bennett, Chemical Publishing Company, 1944, pages 68 and 69). Under the microscope the crystal structure of ozokerite is very similar to that of microcrystalline wax and the two waxes exhibit closely similar properties. Some of the ozokerites available do not respond to the rapid cooling procedure of the present invention while others do. The reason for the different behavior is not understood, but the invention contemplates, and it is desired to embrace as equivalents of microcrystalline wax those ozokerites and also other hydrocarbon waxes which are similar to microcrystalline wax and which when dissolved in mineral oil having a Saybolt Universal viscosity of 340 seconds at 38 C. in the amount of 12% of the weight of the resulting solution form a composition which when rapidly cooled has a viscosity of at least 150% of that of the same composition when slow cooled, and which when heated to 90° C. and then slowly cooled exhibits a reduction of viscosity equal to at least 33%, the rapid and slow cooling procedures being as described hereinafter in connection with Example 1 and the viscosity being measured at 25° C. by the Brookfield viscosimeter at one R. P. M.

In making the improved composition of the invention, a consistency modifying proportion of the modifying agent is dissolved in the mineral oil at the elevated temperature required for solution. In the absence of an opacity producing substance, the solution is clear as distinguished from being cloudy. If ingredients such as medicaments are to be added, this may be done at this stage of the process, if desired, or alternatively at a later stage as will be described hereinafter. If the resulting composition is not fluid, the temperature thereof is preferably raised sufficiently to bring it to a fluid condition and it is agitated until a thoroughly uniform intimate mixture is obtained. The temperature thereof may then be adjusted to the temperature at which it is desired to start the chilling operation, which is an elevated temperature at which the modifying agent is soluble in the mineral oil. It is then chilled to a lower temperature at which the modifying agent is insoluble in the mineral oil, the cooling being at a rate of at least 65 degrees C. per minute.

The chilling is carried out without vigorous agitation and without adding constituents or substantially altering the concentration of microcrystalline wax in the composition. The product is a viscous composition which possesses a smooth, homogeneous consistency and is very stable as described heretofore. Such advantageous properties are produced by the chilling operation and are not obtained when the solution is subjected to ordinary slow cooling as by allowing a quantity thereof to stand in an atmosphere at room temperature. As a modification of the procedure described heretofore, the ingredients other than the mineral oil and microcrystalline wax may be added after instead of prior to the chilling operation, in which case they are thoroughly distributed by a mixing or milling operation.

The proportions of the modifying agent are not critical and may vary over wide limits, depending upon several factors, such as the viscosity of the mineral oil base, the molecular weight or melting point of the modifying agent, the presence or absence of added ingredients and the amount and character of the latter, etc. Substantial modifying results including an increase in viscosity are obtained with an amount of microcrystalline wax equal to about 5% to 25% of the combined weight of the mineral oil and microcrystalline wax. When ingredients other than mineral oil and modifying agent are included they may impart a thickening effect and the proportion of microcrystalline wax to mineral oil may be less than it would otherwise be, but the presence of the modifying agent and the chilling are the factors which are primarily responsible for the improved properties of homogeneity, stability, etc. described heretofore.

When the solution of mineral oil and modifying agent without opacity producing ingredients, is chilled from the elevated temperature, a clouding effect occurs at a rather definite temperature during which the solution changes from a clear liquid to one which is cloudy or turbid. With the chilling, the clouding effect accompanies a change of condition in which the modifying agent goes out of true solution and into a colloidally dispersed condition in the mineral oil. The resulting composition is a colloidal solution in which the mineral oil is the dispersion medium and the modifying agent is the dispersoid. This change of condition provides the improved properties described heretofore and the two phenomena, cloudiness and altered condition, are interrelated and exist together in the chilled product. The temperature at which a substantial clouding occurs varies with the melting point and concentration of the modifying agent and also with the viscosity of the oil, as exemplified by the following schedule. Clouding occurs at approximately the same temperature when the solution is cooled slowly as when it is cooled rapidly, or chilled. However, the same beneficial effects are not realized on slow cooling. In the latter case, a colloidal solution is not formed, but rather the modifying agent passes out of true solution and forms coarse agglomerates in the mineral oil. The result is that while the composition appears homogeneous immediately after cooling, it actually is not and the components undergo substantial segregation in a short time and bleeding of mineral oil occurs.

The temperature at which clouding occurs is determined by observation while stirring a quantity of the solution and allowing it to cool slowly by standing in the atmosphere at room temperature. The compositions of the schedule include the oil and the modifying agent only, without additional ingredients. Unless otherwise indicated, throughout the specification the viscosity of the oil is given in terms of the Saybolt Universal viscosity in seconds at 38° C., the melting point of the modifying agent is given in degrees C. and the concentration of the modifying agent is given in percent by weight of the mineral oil-microcrystalline wax composition, and the viscosity is given in poises as determined by the Brookfield rotational viscosimeter operating at one R. P. M. With microcrystalline wax, the wax having an average molecular weight of 568 has a melting point of 71° C. and that having an average molecular weight of 673 has a melting point of 88° C.

| Oil | Viscosity of oil, sec. | Modifying Agent | Melting point of modifying agent, ° C. | Concentration of mod. agt., percent | Cloud Point, ° C. |
|---|---|---|---|---|---|
| Mineral | 340 | Microcrystalline wax. | 71 | 13 | 66 |
| Do | 340 | do | 88 | 5 | 66.5 |
| Do | 340 | do | 88 | 12 | 70 |
| Do | 340 | do | 88 | 25 | 76 |
| Do | 75 | do | 88 | 12 | 69 |
| Polybutene | 335 | do | 88 | 12 | 71 |
| Mineral | 340 | Ozokerite | 70 | 5 | 49 |
| Do | 340 | do | 78 | 12 | 63 |

The clouding increases as the cooling continues. With a modifying agent having a melting point in a narrow range, the increase extends over a cooling range of a few degrees. With a mixture of modifying agents having different melting points, the cloudiness may increase over a relatively wide range. For simplicity, this range at which the clouding occurs as described will herein, in the specification and claims, be called the cloud range and the point at which substantial clouding begins will be called the cloud point. The cloud range is the temperature range above which the modifying agent is soluble in the mineral oil and below which it is insoluble or substantially so.

In carrying out the chilling procedure, the temperature of the mineral oil-modifying agent solution, with or without added ingredients, is first adjusted so that it is substantially at or above the cloud point, preferably above, and then the solution is chilled. The cooling should extend through a substantial portion of the cloud range and preferably through the entire cloud range. A cooling range of 10 degrees C. produces a substantial improvement effect but greater ranges usually produce an increased effect and are preferred, and cooling may be from an upper temperature at or above the cloud point to a lower temperature of 40° C. or lower. A lower temperature of approximately 25° C. or lower is preferred because it results in a product in which there is little or no bleeding. An upper temperature of from a few degrees above the cloud point to about 100° C. is preferred, but not above the temperature at which any of the ingredients boil or are deleteriously affected, and a lower temperature of about 25° C. to 0° C. is preferred. The rate of cooling should be at least 65 degrees C. per minute and rates as high as 8,000 degrees C. per minute have been used with remarkably improved results. For general purposes, cooling from an upper temperature of 90° C. to 100° C. to a lower temperature of 25° C. to 0° C. in the space of one minute or less produces satisfactory results.

Any suitable method of heat exchange may be used for the cooling. While it is being chilled the composition should be in the form of a body having at least one small dimension, in order that cooling will be rapid throughout the volume thereof. A layer having a thickness up to 0.15 inch is suitable. In one method which has been used with success, the solution at the high temperature is flowed in the form of a thin layer upon one surface of a sheet of heat conductive material such as steel or other metal while the opposite surface is cooled by a fluid coolant, such as water. For example, the solution may be flowed upon the exterior surface of a rotating hollow steel roll or drum and the cooling water may be brought into contact with the interior surface of the roll as is described more fully hereinafter in connection with Example 1.

To show the results obtained with various cooling rates and various compositions, data are given in the following tables, each table relating to a separate composition and showing the effects of different cooling rates upon that composition. Where cooling rates of more than 800 degrees C. per minute are listed the roll cooling was used as described above and more in detail hereinafter in connection with Example 1. Where cooling rates of less than 800 degrees C. per minute are given, a thin layer of the solution was placed on the bottom of a shallow aluminum pan which was floated in an agitated water bath in which the water was initally at the temperature of 90° C. and was cooled at controlled rates by adding cold water. In every case the thickness of the layer of solution was between .006 inch and .030 inch whereby the composition was cooled rapidly throughout its volume. The temperature of the composition during viscosity measurement was in some cases slightly different from others as indicated in the tables, but this did not have a significant effect upon the results.

The test for bleed is made by forming in the composition a cavity in the form of an inverted right circular cone in which the genetrix makes an angle of 45° with the base, causing the composition to stand at a temperature of 50° C. for 15 hours and at the end of such time determining the quantity of oil which has collected at the apex of the cavity. For this purpose the oil may be poured off and weighed.

TABLE NO. 1

*90% mineral oil (visc. 75 sec.), 10% microcrystalline wax (mol. wt. 673)*

| Cooling rate, ° C. per min. | Viscosity | | Bleed at 50° C. |
|---|---|---|---|
| | Poises | ° C. | |
| 2 | 400 | 24 | Oil separates readily. |
| 10 | 660 | 18.5 | Considerable. |
| 66 | 900 | 21 | Moderate. |
| 914 | 1,200 | 24 | Slight. |

TABLE NO. 2

*75% mineral oil (visc. 75 sec.), 25% microcrystalline wax (mol. wt. 673)*

| Cooling rate, ° C. per min. | Viscosity | | Bleed at 50° C. |
|---|---|---|---|
| | Poises | ° C. | |
| 2 | 1,300 | 25 | Slight. |
| 10 | 3,400 | 25 | None. |
| 58 | 3,900 | 21 | Do. |
| 840 | 4,400 | 24 | Do. |

TABLE NO. 3

*95% mineral oil (visc. 340 sec.), 5% microcrystalline wax (mol wt. 678)*

| Cooling rate, ° C. per min. | Viscosity | | Bleed at 50° C. |
|---|---|---|---|
| | Poises | ° C. | |
| 2 | liquid | | |
| 10 | 800 | 23 | Moderate. |
| 60 | 1,100 | 24 | Do. |
| 868 | 1,500 | 23 | Do. |

TABLE NO. 4

*90% mineral oil (visc. 340 sec.), 10% microcrystalline wax (mol. wt. 678)*

| Cooling rate, ° C. per min. | Viscosity | | Bleed at 50° C. |
|---|---|---|---|
| | Poises | ° C. | |
| 2 | 1,200 | 25 | None. |
| 10 | 1,800 | 24 | Do. |
| 60 | 2,500 | 25 | Do. |
| 938 | 2,800 | 24 | Do. |

TABLE NO. 5

*75% mineral oil (visc. 340 sec.), 25% microcrystalline wax (mol. wt. 678)*

| Cooling rate, ° C. per min. | Viscosity | | Bleed at 50° C. |
|---|---|---|---|
| | Poises | ° C. | |
| 2 | 3,400 | 25 | None. |
| 10 | 8,000 | 23 | Do. |
| 60 | 10,000 | 23 | Do. |
| 966 | 10,500 | 24 | Do. |

The data show that a cooling rate of approximately 65 degrees C. per minute or higher produces a composition having high viscosity and a small amount of bleed. With two compositions the viscosity is approximately 75% of the viscosity obtained by roll cooling, and with the remaining three it is more than 88% of such viscosity. With respect to bleed considerable bleed means that more than 0.2 gram of oil collects at the apex of the cone-shaped cavity and this is considered to be generally unsatisfactory for commercial use, moderate bleed means that 0.1 to 0.2 gram of oil collects in the cavity, which is satisfactory for most uses, and slight bleed means that less than 0.1 gram of oil collects in the cavity, which is quite satisfactory for commercial use.

The following are specific examples of the improved viscous composition of the present invention and of the method of preparing the same. The first example is a mineral oil-microcrystalline wax primary composition which may be used as a cream base for salves, ointments, cosmetic creams, etc. or as an adhesive for air filters, and the second is an ointment composed of the mineral oil-microcrystalline wax base with medicaments incorporated therein. It is understood that a wide variety of ingredients other than the medicaments specifically mentioned may be incorporated with the cream base.

EXAMPLE 1

A mixture is prepared containing 88 parts by weight of mineral white oil having a viscosity of 340 seconds and 12 parts of microcrystalline wax having a melting point of 88° C. The mixture is heated to a temperature of approximately 100° C. and maintained at that temperature with agitation until the microcrystalline wax is thoroughly dissolved in the mineral oil and a clear, transparent solution results. The temperature of the solution is then adjusted to approximately 90° C. and it is flowed in the form of a layer approximately .005 to .01 inch thick upon the exterior surface of a rotating hollow steel drum, the interior surface of which is contacted with relatively cold water, a temperature of about 25° C. being suitable. In this procedure the layer of the liquid composition upon the surface of the drum cools suddenly throughout its volume, and the drop in temperature has been observed to occur within the space of 0.1 minute. The composition thickens into a non-fluid, paste-like mass which is scraped from the drum surface. The rate of flow upon the drum and the other heat exchange conditions are controlled so that the composition is chilled to a temperature of about 30° C. The composition is a stable homogeneous colloidal solution of microcrystalline wax in mineral oil. It has a viscosity of 3360 poises at 25° C. It retains its uniform paste-like consistency for a long period of time and possesses the other advantages described heretofore. An important advantage is that the cone penetration value (test procedure described in U. S. Pharmacopoeia, 13th revision, page 629) and the viscosity are relatively uniform at varying temperatures above the pour point of the mineral oil and up to high summer temperature, for example 45° C. The same solution of mineral oil and microcrystalline wax when allowed to cool slowly from the elevated temperature of 90° C. to 25° C., as by allowing a quantity thereof to stand in an atmosphere at a temperature of 25° C. is not a colloidal solution but a mass in which the microcrystalline wax is present in the form of coarse agglomerates. It has a viscosity of 640 poises at 25° C. when measured in the same manner as described above. The product is not homogeneous and a portion of the oil readily separates and forms as a layer on the top of the composition.

EXAMPLE 2

In this example, the plastic, paste-like composition of mineral oil and microcrystalline wax obtained by the method of Example 1 is mixed with gum camphor, in the proportions of 20 parts by weight of the gum camphor to 80 parts by weight of the oil-microcrystalline wax base. For this operation the gum camphor is previously sub-divided into small pieces and masticated thoroughly into the plastic base. Complete solution of the gum camphor takes place within one or two days, and may be hastened by occasional working of the mixture. The result is an ointment having a viscosity somewhat lower than that of the oil-microcrystalline wax base of Example 1. The ointment may be used for the relief of colds, skin irritations, etc. In this example the gum camphor is the active agent of the ointment and the mineral oil and microcrystalline wax cooperate to form a supporting vehicle for the active agent. Any suitable active agent may be used in this manner, as the many medicaments, such as zinc oxide, which is a solid, or methyl salicylate, which is an oil. A great many active agents for medical, pharmaceutical and other purposes are known and may be used with the supporting vehicle of mineral oil and microcrystalline wax.

EXAMPLE 3

A composition is made of the following ingredients:

| | Parts by weight |
|---|---|
| Mineral oil (visc. 340–350 sec.) | 60 |
| Microcrystalline wax (melting point 88° C.) | 10 |
| Neat's-foot oil | 25 |
| Calcium stearate | 5 |

The ingredients are all stirred together and heated to 150° C. to dissolve the microcrystalline wax and the calcium stearate and form a clear liquid. The temperature is then adjusted to about 100° C. and the composition is chilled as described in connection with Example 1. The result is a smooth, non-fluid paste which is useful as a leather dressing. The neat's-foot oil is an example of the oils of the fatty acid type which may be included with the mineral oil. The oils which may be used are the glycerides of the aliphatic carboxylic acids having at least four carbon atoms and which are liquid at any temperature between 20° C. and 50° C., examples of which are the following oils, castor, olive, linseed, corn, almond, peanut, sesame, tall, sperm, lard, etc. The mineral oil should constitute the major proportion of the oils.

EXAMPLE 4

An ointment is prepared having the following composition:

| | Parts by weight |
|---|---|
| Mineral white oil (visc. 340–350 sec.) | 38 |
| Microcrystalline wax (melting point 88° C.) | 12 |
| Methyl salicylate | 50 |

The composition is heated to approximately 95° C. with agitation until the microcrystalline wax and the methyl salicylate are dissolved in the mineral oil, and the solution is then chilled to room temperature (20° C.) in the same manner as described in connection with Example 1. The resulting composition is a non-fluid, unctuous ointment having a smooth, uniform consistency which it retains for a long period of time.

EXAMPLE 5

A composition is prepared with the following ingredients:

| | Parts by weight |
|---|---|
| Mineral white oil (visc. 75–80 sec.) | 79 |
| Microcrystalline wax (melting point 88° C.) | 11 |
| Glyceryl monostearate | 9 |
| Titanium dioxide | 1 |

The first three ingredients are heated together at 90° C. with thorough agitation until the microcrystalline wax is dissolved in the mineral oil and the glyceryl monostearate is melted. The composition is then chilled from 90° C. to approximately 25° C. in a manner similar to that described in connection with Example 1. The titanium dioxide is then intimately mixed with the composition, preferably by a milling operation. The result is a non-fluid unctuous cosmetic cleansing cream which is of hydrophilic character and possesses the improved uniform consistency and stability which has been described heretofore. In this composition glyceryl monostearate is an emulsifier which imparts the hydrophilic character. Any suitable emulsifier may be used. This class of compound is well known and includes a large number of substances such as the various derivatives of carboxylic acid, such as soaps, the glycol and glyceryl stearates, the amino, sulfonated, sulfated, etc. derivatives, etc.

EXAMPLE 6

Approximately 10 parts by weight of water may be incorporated in the cream composition which is the final product of Example 5 and thoroughly emulsified therewith by means of a colloid mill. The result is a non-dehydrating hydrophilic cleansing cream.

EXAMPLE 7

A composition is prepared from the following ingredients:

| | Parts by weight |
|---|---|
| Polybutene (visc. 335 sec.) | 88 |
| Microcrystalline wax (melting point 88° C.) | 12 |

The ingredients are heated together at a temperature of approximately 100° C. and thoroughly agitated until the microcrystalline wax is dissolved in the polybutene. The temperature is then adjusted to approximately 90° C. and the composition is chilled by a procedure similar to that described in connection with Example 1 to a temperature of approximately 30° C. A non-fluid, unctuous composition is obtained having substantially the same physical properties as does the product of Example 1. It may be used as an ointment, or as an ointment base with which medicaments or other ingredients may be compounded.

EXAMPLE 8

The following composition is prepared:

| | Parts by weight |
|---|---|
| Mineral oil (visc. 340 sec.) | 88 |
| Microcrystalline wax (melting point 88° C.) | 12 |

The microcrystalline wax is brought into solution in the mineral oil as in Example 1 and the temperature is adjusted to approximately 90° C. Crystalline penicillin "G" in the form of finely divided powder is added in sufficient amount to bring the potency of the mixture to 25,000 units per gram. The whole is thoroughly and uniformly mixed and then cooled in the form of a thin layer on the exterior surface of a steel drum to a temperature of about 25° C. by a procedure similar to that described in connection with Example 1. A composition containing penicillin in remarkably uniform dispersion is obtained. It has a viscosity of 3200 poises at 25° C. It is useful in combating bovine mastitis.

EXAMPLE 9

A composition is prepared having the following ingredients:

| | Parts by weight |
|---|---|
| Mineral white oil (visc. 350 sec.) | 95 |
| Ozokerite (melting point 70° C.) | 5 |

The ozokerite is designated No. 71–W Domestic White Ozokerite Wax obtained from Innis, Speiden & Company, 117 Liberty Street, New York city. The ingredients are heated together at approximately 90° C. with agitation until the ozokerite is dissolved in the mineral oil. The temperature of the solution is then adjusted to approximately 70° C. and it is chilled by a procedure similar to that described in connection with Example 1 to a temperature of approximately 28° C. The product is a non-fluid, plastic paste having the advantageous properties described heretofore which is suitable for use as a thin, low melting point ointment or an ointment base with which medicaments or other ingredients may be incorporated. The product has a viscosity of 520 poises at 20° C. A similar product which has been cooled by the slow cooling process described in connection with Example 1 has a viscosity of 280 poises. Also, the latter product does not have as smooth a consistency as does the product of Example 8 and does not retain the uniform consistency, but a portion of the oil separates and forms a layer at the top of the composition in a relatively short time.

The examples of the invention which have been described heretofore are by way of illustration only and the invention is not limited thereto but embraces such applications and variations thereof as will occur to those skilled in the art.

The viscous composition of the present invention which has been formed by the chilling procedure described herein, when heated to a temperature above the cloud point, for example 90° C., and then cooled slowly as described in connection with Example 1, exhibits a reduction of viscosity equal to at least 33% at 25° C. Also, it is altered by such heating and slow cooling from a product having a smooth, uniform, homogeneous consistency in which the microcrystalline wax is colloidally dispersed in the mineral oil to one which is non-homogeneous and in which the microcrystalline wax is coarsely agglomerated. The product can be restored to the more viscous, smooth, homogeneous consistency by again heating it above the cloud point and subjecting it to the rapid cooling procedure described herein. The product is, therefore, in these respects thermally reversible.

This application is a continuation-in-part of my co-pending application Serial No. 191,491, filed October 21, 1950, now abandoned.

What is claimed is:

1. The method of preparing a thixotropic composition having the consistency of a plastic cream and including mineral oil, which comprises dissolving microcrystalline wax in said mineral oils the amount of microcrystalline wax being approximately 5% to 25% of the combined weight of the mineral oil and microcrystalline wax, and chilling said composition uniformly at a rate of at least 65 degrees C. per minute from a temperature at which said microcrystalline wax is soluble in said mineral oil to a temperature at which said microcrystalline wax is insoluble in said mineral oil.

2. The method as claimed in claim 1 in which the solution is chilled through a temperature range of at least 10 degrees C.

3. The method as claimed in claim 1 in which the lower temperature is not higher than about 25° C.

4. The method as claimed in claim 1 in which the solution is chilled from an upper temperature of at least about 70° C. to a lower temperature of not higher than about 40° C.

5. The method as claimed in claim 1 in which the mineral oil is polybutene.

6. The method of preparing a thixotropic composition having the consistency of a plastic cream and including mineral oil in a major proportion and an oil of the class consisting of the glycerides of the aliphatic carboxylic acids having at least four carbon atoms and which are liquid at any temperature from 20° C. to 50° C., which comprises dissolving microcrystalline wax in said oils, the amount of microcrystalline wax being approximately 5% to 25% of the combined weight of the mineral oil and microcrystalline wax, and chilling said composition uniformly at a rate of at least 65 degrees C. per minute from a temperature at which said microcrystalline wax is soluble in said mineral oil to a temperature at which said microcrystalline wax is insoluble in said mineral oil.

7. The method of preparing a thixotropic composition having the consistency of a plastic cream which comprises chilling a solution of microcrystalline wax in mineral oil uniformly from a temperature above the cloud point of said solution to a temperature below said cloud point, said chilling being at a rate of at least 65 degrees C. per minute and through a range of at least 10 degrees C., the amount of microcrystalline wax being approximately 5% to 25% of the combined weight of the mineral oil and microcrystalline wax.

8. The method of preparing a thixotropic composition having the consistency of a plastic cream and having a mineral oil base, which comprises forming a solution of microcrystalline wax in said mineral oil at an elevated temperature, said microcrystalline wax being present in an amount equal to approximately 5% to 25% of the weight of said mineral oil-microcrystalline wax solution, and while said solution is at a temperature above the cloud point thereof bringing a layer of said solution into contact with a surface maintained at a temperature below the cloud point of said solution, whereby said solution is suddenly cooled through a temperature range including said cloud point.

9. The method as claimed in claim 8 in which the solution is cooled to a temperature not higher than approximately 40° C.

10. The method as claimed in claim 8 in which the layer of solution brought into contact with the cooling surface is not more than approximately 0.15 inch thick.

11. A thixotropic composition having the consistency of a plastic cream including mineral oil and microcrystalline wax, the amount of microcrystalline wax being approximately 5% to 25% of the combined weight of the mineral oil and microcrystalline wax, said microcrystalline wax having been initially in solution in said mineral oil and said solution having been chilled at a rate of at least 65 degrees C. per minute through a temperature range of at least 10 degrees C. including the cloud point of said solution.

12. A thixotropic hydrophilic composition having the consistency of a plastic cream comprising mineral oil, microcrystalline wax and an emulsifier, said mineral oil and microcrystalline wax being in the form of a stable, homogeneous colloidal solution in which the microcrystalline wax is the dispersoid, the amount of microcrystalline wax being approximately 5% to 25% of the combined weight of the mineral oil and microcrystalline wax.

13. A thixotropic composition having the consistency of plastic cream, comprising an emulsion of water and an oil composition, said oil composition comprising a stable, homogeneous, thixotropic colloidal solution of microcrystalline wax in mineral oil, the amount of microcrystalline wax being approximately 5% to 25% of the combined weight of the mineral oil and microcrystalline wax.

14. A thixotropic composition having the consistency of a plastic cream comprising a stable, homogeneous colloidal solution containing mineral oil as the dispersion medium and microcrystalline wax as the dispersoid, the amount of microcrystalline wax being approximately 5% to 25% of the combined weight of the mineral oil and microcrystalline wax.

15. A thixotropic composition having the consistency of a plastic cream comprising a colloidal solution of microcrystalline wax in mineral oil, said composition containing about 5% to 25% of microcrystalline wax, based on the combined weight of the mineral oil and microcrystalline wax, said composition exhibiting a reduction of viscosity equal to at least 33% as measured at 25° C. by the Brookfield viscosimeter at one R. P. M. upon being heated to 90° C. and cooled slowly by allowing a mass thereof to stand in an atmosphere at 25° C.

16. A thixotropic composition having the consistency of a plastic cream comprising liquid mineral oil and microcrystalline wax, said microcrystalline wax being in the form of a space lattice and said mineral oil being contained within said space lattice, the amount of microcrystalline wax being approximately 5% to 25% of the combined weight of the mineral oil and microcrystalline wax.

17. The method of making a thixotropic composition having the consistency of a plastic cream and containing mineral oil and microcrystalline wax, which comprises preparing a solution containing said microcrystalline wax dissolved in said mineral oil at an elevated temperature, said microcrystalline wax comprising approximately 5 percent to 25 percent of the combined weight of said mineral oil and microcrystalline wax, and cooling said solution in the form of a body having at least one dimension not exceeding 0.15 inch at a rate of at least 65 degrees C. per minute through a temperature range including the cloud point of said solution.

References Cited in the file of this patent

UNITED STATES PATENTS

| | | |
|---|---|---|
| 314,488 | Teagle | Mar. 24, 1885 |
| 316,058 | Prentiss | Apr. 21, 1885 |
| 2,098,007 | Mapes et al. | Nov. 2, 1937 |
| 2,384,848 | Peters | Sept. 18, 1945 |
| 2,535,604 | Schiermeier et al. | Dec. 26, 1950 |
| 2,595,158 | McCue et al. | Apr. 29, 1952 |
| 2,617,754 | Neely | Nov. 11, 1952 |
| 2,627,938 | Frohmader et al. | Feb. 10, 1953 |